(12) United States Patent
Isarov et al.

(10) Patent No.: US 7,008,982 B2
(45) Date of Patent: Mar. 7, 2006

(54) SURFACE TREATED SILICAS

(75) Inventors: Aleksey Isarov, Kennesaw, GA (US); Thomas J. Lynch, Roswell, GA (US)

(73) Assignee: J.M. Huber Corporation, Edison, NJ (US)

( * ) Notice: Subject to any disclaimer, the term of this patent is extended or adjusted under 35 U.S.C. 154(b) by 0 days.

(21) Appl. No.: 10/673,797

(22) Filed: Sep. 29, 2003

(65) Prior Publication Data

US 2005/0069708 A1    Mar. 31, 2005

(51) Int. Cl.
*C08L 63/00* (2006.01)
*C09K 3/34* (2006.01)
*B05D 7/00* (2006.01)
*B05D 1/36* (2006.01)
*B32B 9/04* (2006.01)

(52) U.S. Cl. ............ 523/443; 523/440; 524/492; 427/214; 427/402; 428/402; 428/403; 428/405; 428/447

(58) Field of Classification Search ........... 428/446, 428/447, 402, 403, 405; 523/440, 443; 524/492, 524/493, 543, 589, 590, 860, 863
See application file for complete search history.

(56) References Cited

U.S. PATENT DOCUMENTS 6,344,240 B1 * 2/2002 Menon et al. ............ 427/220
2003/0027896 A1 * 2/2003 Amano et al. ............ 523/212

* cited by examiner

*Primary Examiner*—Michael J. Feely
(74) *Attorney, Agent, or Firm*—Carlos Nieves; David Mitchell Goodrich

(57) ABSTRACT

Disclosed is a silica substrate treated with a polysiloxane, and an organosilane, wherein the organosilane is described by the formula: $RSi(R')_x(OR'')_{3-x}$; wherein R is a long-chain hydrocarbon group having between about 8 to about 30 carbon atoms, which may also contain organofunctional groups such as vinyl, methacryl, amino, sulfur, and epoxy groups; R' and R'' are independently selected from a methyl and ethyl group; and X is either 0 or 1. The optimal use for the treated silica substrate is as a rheology modifier in epoxy polymer materials, however, the silica substrate could also be used in other chemical compositions such as polyurethanes, polyesters, silicones, and hydrocarbon oils.

7 Claims, 3 Drawing Sheets

US 7,008,982 B2

SURFACE TREATED SILICAS

BACKGROUND OF THE INVENTION

One of the most important characteristics of a liquid chemical is its viscosity. In fact, special chemical components called "rheology modifiers" are commonly added to such chemical compounds in order to maintain their viscosity within a desired range or to exhibit a desired viscosity profile. One particularly desired viscosity profile that can be obtained through the use of rheology modifiers is a "pseudoplastic" or "shear thinning" type viscosity profile.

In a shear thinning profile the liquid composition exhibits high viscosity at low shear conditions, and lower viscosity at high shear conditions. One readily identifiable chemical compound with a shear thinning viscosity profile is house paint. When paint is subjected to high shear (for example by agitating or stirring it with a brush), the paint "thins" and this decrease in the viscosity allows the brush to be moved through the paint. Correspondingly, under low shear conditions (e.g., when the movement or agitation of the brush stops), the paint thickens and adheres to the bristles of the brush with minimal dripping. When the paint is applied to the surface to be painted with either a brush or a spray nozzle the paint is again subjected to shearing forces that cause the paint to thin again and flow off the brush onto the painted surface. As the paint lies on the surface, it is being subjected to only miniscule amounts of shear (by the force of gravity) so that the paint thickens, thus keeping it in place and preventing undesirable dripping or sagging until the paint dries.

As with paints, so also other liquid chemicals and polymers are formulated to have shear thinning viscosity profiles. One such example of a rheology control agent is fumed silica, which is prepared from $SiCl_4$ in a flame hydrolysis process. Despite the advantages of fumed silica, product formulators have cited problems with both hydrophobic and hydrophilic forms of fumed silica. For example, because of its moisture-absorbing silanol groups, hydrophilic fumed silica tends to cause problems in electronic adhesives or coating applications because the increased water concentration decreases electrical resistance. Additionally, in coating applications, this moisture, introduced by the hydrophilic fumed silica, can accelerate corrosion of the coated substrate. Also, the shear-thinning efficiency of hydrophilic fumed silica is often inadequate, which is thought to result from adsorption of the liquid onto the fumed silica surface, preventing silica aggregation and thus shear-thinning.

It has been suggested that many of the problems associated with hydrophilic fumed silicas can be avoided by treating the fumed silica with organotrialkoxysilanes. See Shirono, et al., *J. Colloid and Interface Science* 239, 555–62 (2001). Alternatively, fumed silica products treated with polydimethylsiloxane are also available, such as the Aerosil® R202 fumed silica from Degussa Corporation, Parsippany, N.J.

However, for many product applications use of surface modified fumed silica is impracticable, because fumed silica is simply too expensive. Also fumed silicas can be cumbersome to process during manufacture. In fact, when adding fumed silica to a liquid polymer composition, even high shear blending is insufficient to disperse the fumed silica particles. It is often necessary to add a process step where the fumed silica-polymer mixture must be passed through a media mill or a three-roll mill in order to sufficiently disperse it. Dispersing fumed silica often necessitates having to make a master batch of the combined fumed silica and liquid to build enough viscosity to increase shear to help dispersion. Furthermore, there is the danger of overdispersing fumed silica which breaks the silica aggregates, ruining the shear-thinning properties. Thus, eliminating the need for these extra process steps as well as avoiding the danger of overdispersing the silica would be highly desirable to product formulators.

Given the foregoing, there is a continuing need for a rheology modifier that has a number of performance characteristics, such as: 1) imparts a strong shear thinning profile to chemical compositions to which it is added; 2) disperses easily into liquids and slurries, eliminating the need for the additional dispersing steps; 3) eliminates the danger of overdispersion of the silica; and finally 4) is sufficiently inexpensive to be used in a wide range of applications.

BRIEF SUMMARY OF THE INVENTION

A silica substrate treated with a polysiloxane, and an organosilane, wherein the organosilane is described by the formula: $RSi(R')_x(OR'')_{3-x}$; wherein R is a long-chain hydrocarbon group having between about 8 to about 30 carbon atoms, which may also contain organofunctional groups such as vinyl, methacryl, amino, sulfur, and epoxy groups; and R' and R" are independently selected from a methyl and ethyl group; and X is either 0 or 1.

A method of preparing a treated silica substrate comprising the steps of: a) providing silica particles; b) contacting the silica particles with a polysiloxane; and c) contacting the silica particles with an organosilane. A polymer composition comprising a silica substrate, the silica substrate treated with a polysiloxane, and an organosilane; wherein the organosilane is described by the formula: $RSi(R')_x(OR'')_{3-x}$; wherein R is a long-chain hydrocarbon group having between about 8 to about 30 carbon atoms, which may also contain organofunctional groups such as vinyl, methacryl, amino, sulfur, and epoxy groups; and R' and R" are independently selected from a methyl and ethyl group; and X is either 0 or 1.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
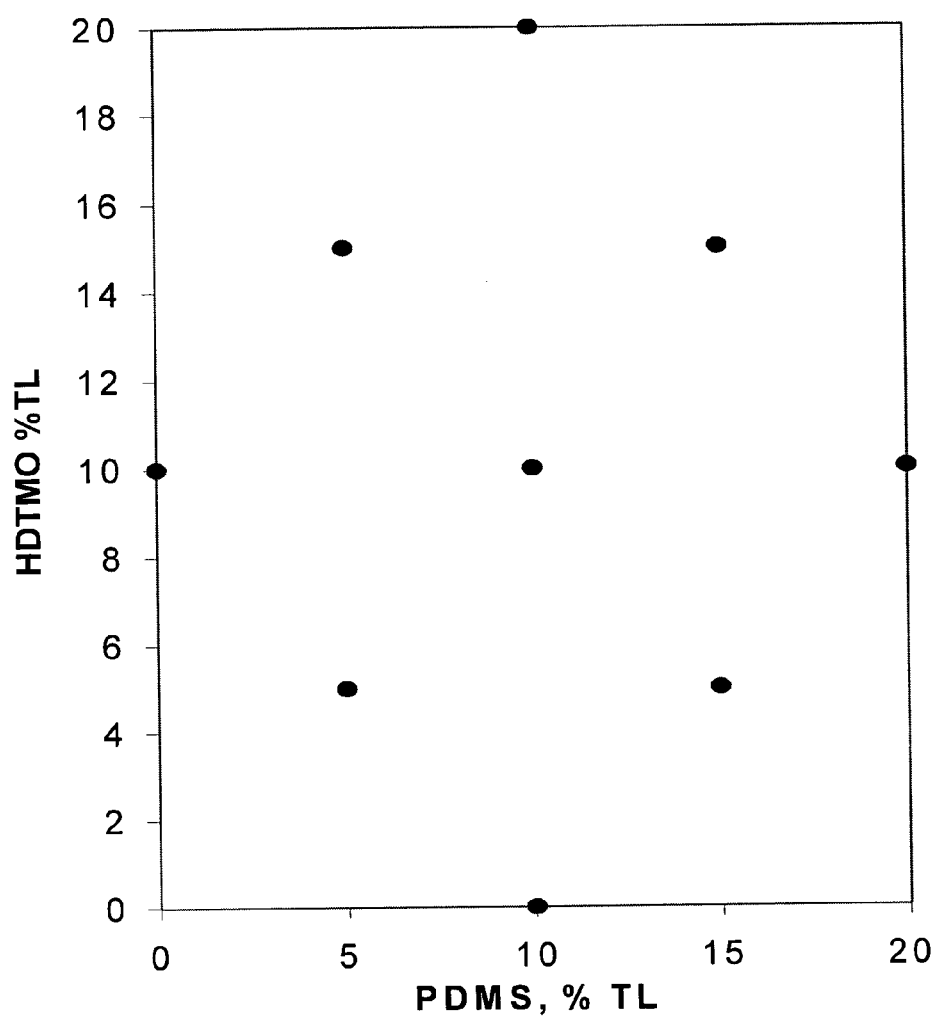
FIG. 1 is a plot showing in graphical form the central composite experimental design of Example 6.

All parts, percentages and ratios used herein are expressed by weight unless otherwise specified. All documents cited herein are incorporated by reference. The following describes preferred embodiments of the present invention, which provides a treated silica substrate for use as a rheology modifier in a variety of polymers and plastics, especially epoxy materials such as bisphenol A epichlorohydrin. While the optimal use for the treated silica substrate is as a rheology modifier in epoxy polymer materials, the silica substrate could also be used in other chemical compositions such as polyurethanes, polyesters, silicones, and hydrocarbon oils, and can impart other functional benefits besides rheology control such as reducing settling in pigmented slurries as well as enhancing the tensile, flexural, and electrical properties of cured components.

When a silica material is said to be "treated" with a chemical like polysiloxane or organosilane, it is meant that the silica material is contacted by the chemical. Polymers and other chemical compounds incorporating this treated silica substrate exhibit desirable shear thinning behavior. Furthermore, this treated silica substrate is also less expensive than a treated fumed silica product, and easier to disperse in a chemical composition thus eliminating the need for additional processing steps. Furthermore, precipitated silica has approximately twice the bulk density as fumed silica, which allows customers to store twice the weight of material in the same warehouse space, and also makes conveying and transporting the higher bulk density precipitated silica easier.

The silica component of the present silica substrate is preferably an amorphous precipitated silica. Preferred precipitated silicas include the following products available from the J.M. Huber Corporation, Edison, N.J.: Zeosyl® 100, Hubersil® 161, Zeothix® 265, Zeothix 95, and Zeothix 177. However, in addition to precipitated silica, the silica substrate may also be selected from (without intending to be limiting) amorphous silicas such as silica gel, metal silicates, and fumed silica. Preferred metal silicates include calcium silicates such as Zeocal™, also available from the J.M. Huber Corporation. Suitable fumed silicas include Aerosil® 90 and Aerosil® 130 available from the Degussa Corporation, Parsippany, N.J. Suitable silica gels include G-100 and G-500 available from Millennium Inorganic Chemicals Corporation, Baltimore Md. Preferably, the silica has a BET specific surface area of from about 50 to about 150 m$^2$/g, and an average particle size of from about 2 to about 10 microns.

The silica is then treated with a combination of two treating reagents: polysiloxane and an organosilane. Although these treating reagents may be added in any order, it is preferred that the polysiloxane be added first, followed subsequently by the organosilane. It has been discovered in the present application that superior shear thinning performance is obtained by adding the reagents in the order of polysiloxane and then organosilane. It would have been unexpected to a person of ordinary skill in the art that such superior shear thinning performance could be obtained by adding these reagents in the specific order of polysiloxane and then organosilane. These performance benefits are discussed in greater detail below. (Techniques for adding the polysiloxane and an organosilane are also discussed in greater detail below.)

Preferable polysiloxanes are characterized by the formula (I), below:

wherein n is an integer greater than 1, preferably between about 30 to about 100;

X is selected from a hydrogen atom or an R' group, preferably methyl;

R, R' are independently selected organic groups, with from about 1 to about 20 carbon atoms; and Y and Z are silicon-containing terminating end groups, preferably Y is —OSi(CH$_3$)$_3$ and Z is —Si(CH$_3$)$_3$.

A preferred polysiloxane is a polydimethylsiloxane such as Dow Corning 200® fluid, available from the Dow Corning Corporation, Midland, Mich.

The organosilane component is characterized by the formula:

wherein R is a long-chain hydrocarbon group having between about 8 to about 30 carbon atoms, which may also contain organofunctional groups such as vinyl, methacryl, amino, sulfur, and epoxy groups; and R' and R" are independently selected from a methyl and ethyl group; and X is either 0 or 1.

A preferred organosilane is hexadecyltrimethoxysilane (where R is a hydrocarbon group having 16 carbon atoms, the R" group has only a single carbon atom and X is 0). A suitable organosilane is available under the trade name Silquest® HDTMS from the Crompton Corporation, Greenwich, Conn.

The treated silica substrate may be used in a variety of different materials. Particularly the treated silica substrate may be incorporated into polymer materials such as epoxies, polyurethanes, polyesters, silicones, and hydrocarbon oils. The substrate is particularly useful in epoxy materials such as bisphenol A epichlorohydrin. A preferred bisphenol A epichlorohydrin epoxy is available from Resolution Performance Products, Houston, Tex. under the tradename EPON™ Resin 828.

As mentioned above, polymer compositions incorporating the treated silica substrate exhibit desirable shear thinning behavior. This shear thinning behavior can be quantified using a shear thinning index (hereinafter "STI"). The STI is the ratio of viscosities at two different values of shear stress, namely 20 Pa and 200 Pa. Thus, STI=$V_{20\ Pa}/V_{200\ Pa}$, where "V" represents the viscosity. A STI value of greater than 1 indicates that the viscosity of the material at low shear forces (i.e., 20 Pa) is higher than the viscosity at higher shear forces (i.e., 200 Pa). Selection of the ratio of viscosities at 20 Pa and 200 Pa to determine STI is common practice, though other pairs of shear stress values can also be used such as 1 Pa: 10 Pa and 30 Pa: 300 Pa. The actual STI values determined using viscosities from other pairs of shear stresses will differ from those reported here, though the conclusions would remain the same.

Preferably, after incorporating the present treated silica substrate, the STI value of the polymer compositions is about 1.2 to about 100, preferably about 1.4 to about 5.

Techniques for measuring shear thinning are discussed in greater detail in the examples below.

Silica particle size distributions were measured on a Cilas Corporation Model 920 particle size analyzer. Untreated silica samples were slurried in water for these measurements while treated silica samples were slurried in isopropanol.

The surface area was determined by the BET nitrogen adsorption methods described in Brunaur, et al., *J. Am. Chem. Soc.*, 60, 309 (1938).

The invention will now be described in more detail with respect to the following, specific, non-limiting examples.

EXAMPLE 1

A surface treated silica was prepared as follows. A 5 L round-bottom flask was charged with 200–300 g of silica powder with a surface area of 107 $m^2/g$ and average particle size 3.5 $\mu$m (Zeothix® 177, manufactured by J.M. Huber Corporation). The silica was dried at 150° C. in the flow of dry nitrogen for 2 hours while stirring. Polydimethylsiloxane (PDMS) Dow Corning 200® fluid, viscosity 50 cSt, was added dropwise. The silica was maintained at 150° C. with stirring and a slow nitrogen purge for 1 hour after the addition of PDMS was complete. Hexadecyltrimethoxysilane (Silquest® HDTMS silane) was then added dropwise. The stirring was maintained under a nitrogen purge at a temperature of 150° C. for 1 hour after the addition of HDTMS was complete. The quantities of PDMS and HDTMS added to a given sample are specified in further examples. The treated silica was then cooled to room temperature.

EXAMPLE 2

The silica surface modification was performed as in Example 1 except the order of reagent addition was reversed: HDTMS was added first, followed by addition of PDMS.

EXAMPLE 3

An epoxy resin-treated silica substrate (4% silica:96% epoxy weight ratio) was prepared as follows. First, four grams of surface treated silica was added to 96 grams of epoxy resin (bisphenol A—epichlorohydrin based epoxy resin, CAS #25068-38-6, manufactured by Resolution Performance Products) and blended gently with a spatula in a 32 oz. disposable polystyrene container until no free powder was left. The treated silica was then dispersed in epoxy resin by a high-speed, high-shear mixer (Dispermat VMA-Geltzmann GmBH D-51580 Reichshof, Germany) with 5-cm Cowles blade at 5000 rpm for 5 min. After dispersing, samples were stored overnight at 50° C. Other epoxy-treated silica composite samples with different silica loading levels were made similarly by adjusting the silica:epoxy weight ratios to 1%:99%, 2.5%:97.5%, 6%:94%, 8%:92%, and 10%:90%.

EXAMPLE 4

The rheological performance of surface treated silica in epoxy resin was evaluated by the value of STI. The STI was measured on AR-1000 rheometer manufactured by TA Instruments, New Castle, Del. The rheometer settings were as follows:

Geometry: 40-mm stainless steel cone-plate, 2° angle, 51-micron truncation.

Temperature: 25.0° C.

Pre-shear conditions: 3 min@ 1000 Pa

Equilibration time: 5 min

Test settings: Ramp shear stress from 0.5 Pa to 2000 Pa, log mode, 10 points per decade.

EXAMPLE 5

The effect of the order of PDMS and HDTMS addition on the rheological performance of treated silica in epoxy resin was studied as follows.

Six replicate treated silica samples were prepared following the procedure described in Example 1 where PDMS was first added to the silica followed by HDTMS. Another six replicate treated silica samples were prepared following the procedure described in Example 2 where HDTMS was first added to the silica followed by PDMS. PDMS and HDTMS were each added to achieve 10% treatment level for a total treatment level of 20%. The weight of the chemicals added was calculated based on the content in the final product. For example, 25.0 g of PDMS and 25.0 g of HDTMS was added to 200 g of silica to achieve 10% concentration for each chemical in 250 g of the final treated silica product. The treated silica samples were dispersed in epoxy resin and their shear thinning indices were measured according to the procedures described in Examples 3 and 4. Results are summarized in Table I below.

TABLE I

| Sample | Mean STI (95% confidence interval) |
| --- | --- |
| Example 1: (Treated first with 10% PDMS, and then 10% HDTMS) | 2.52 (2.40–2.65) |
| Example 2: Treated first with 10% HDTMS, and then 10% PDMS) | 1.95 (1.85–2.05) |

The mean and 95% confidence intervals were calculated from the six STI values from Example 1 and Example 2. The significant difference in the means of these examples establishes that the order of addition of PDMS and HDTMS has a significant effect on product performance. Example 1 yields the higher value of STI. It would have been unexpected to a person of ordinary skill in the art that such superior shear thinning performance, as shown by the differences in the STI values in Table I above, could be obtained by treating the silica substrate with these two surface treating reagents in the specific order of PDMS and then HDTMS.

EXAMPLE 6

Studying various treatment levels of PDMS and HDTMS on the rheological performance of treated silica further uncovered an unexpected synergy between PDMS and HDTMS that would be unexpected to a person of ordinary skill in the art. This study was performed using a central composite experimental design (FIG. 1). Nine treated silica samples were prepared in duplicate according to the procedure described in Example 1 using PDMS and HDTMS percentages shown in Table II and in FIG. 1. Treated silica samples were dispersed in epoxy resin and the STI values were measured according to the procedures described in Examples 3 and 4. Results are summarized in Table II and FIG. 2 below.

TABLE II

| PDMS on precipitated silica | HDTMS on precipitated silica | Mean STI |
|---|---|---|
| 5% | 5% | 1.72 |
| 0% | 10% | 1.62 |
| 5% | 15% | 2.09 |
| 10% | 20% | 2.10 |
| 15% | 15% | 2.25 |
| 20% | 10% | 2.48 |
| 10% | 10% | 2.31 |
| 10% | 0% | 1.41 |
| 15% | 5% | 2.00 |

Figure 2:
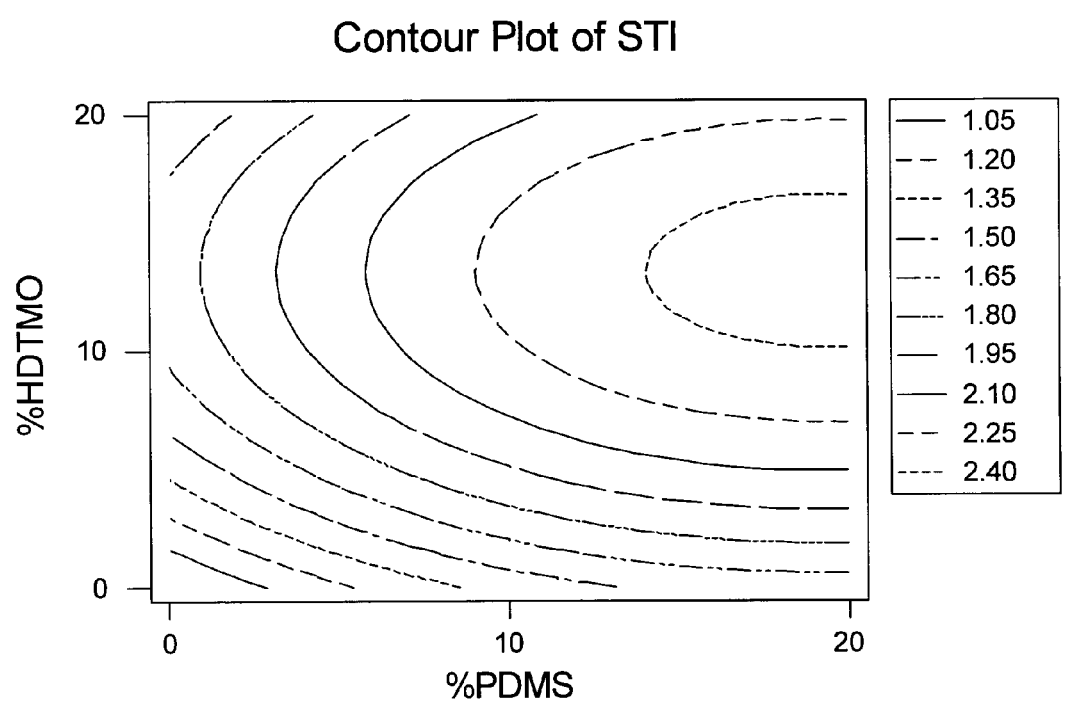
FIG. 2 is a contour plot showing the shear thinning indices of 4%:96% treated silica/epoxy resin compositions for various treatment levels of hexadecyltrimethoxysilane (HDTMS) and polydimethylsiloxane (PDMS) on the treated silicas.

FIG. 2 is a contour plot representation of the response surface that fits the data in Table 2. As can be seen in FIG. 2 and Table 2, when using PDMS by itself, the maximum STI value achievable is 1.6, even at the highest (20%) treatment level. Similarly, when using HDTMS by itself, the maximum STI value achievable is 1.7, at an HDTMS treatment level of 15%. Further increases in HDTMS treatment level are predicted to decrease the STI value. Thus, using PDMS and HDTMS together in a dual surface treatment provides synergistic benefits: the result is a PDMS/HDTMS treated silica that imparts a significantly higher STI value than can be achieved by treating silica with either PDMS or HDTMS separately at any treatment level. For example, surface treating silica with 10% PDMS and 10% HDTMS according to Example 1 led to an STI value of 2.2–2.3. The best rheological performance (STI=2.45) is achieved at about 19% PDMS and about 13% HDTMS treatment levels when added to silica in this specific order. This synergistic improvement in the STI value obtained by the use of the dual treatment combination of PDMS and HDTMS (applied in the order PDMS first, and the HDTMS) would have been unexpected to a person of ordinary skill in the art.

EXAMPLE 7

Figure 3:
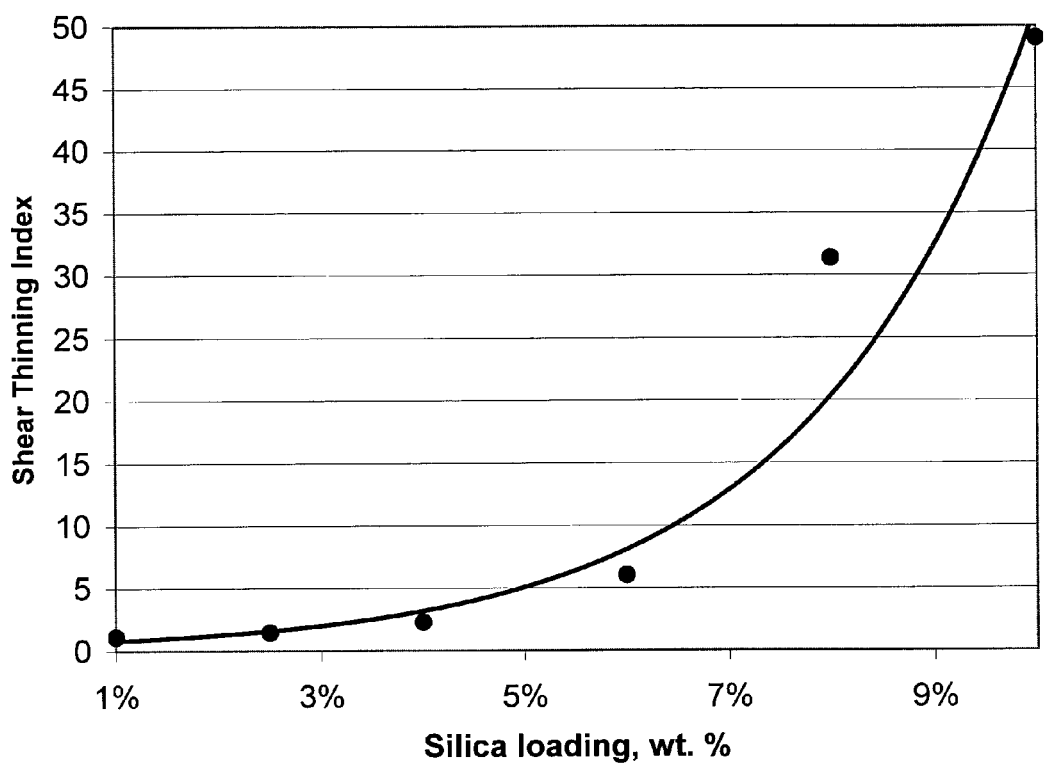
FIG. 3 is a graph showing the relationship between the silica concentration in an epoxy resin and the shear thinning index of the silica-epoxy composite resin.

Treated silica samples were prepared according to Example 1 using 10% PDMS and 10% HDTMS. These treated silica samples of this invention were then dispersed in epoxy resin at several different loading levels and their STI values were measured as described in Examples 3 and 4. These treated silica loading levels were 1%, 2.5%, 4%, 6%, 8%, 10%. Results are plotted in FIG. 3 where the most highly loaded epoxy-treated silica composite has a STI of 49. These inventive silicas can therefore be used to provide a wide range of shear thinning values in epoxy resins.

EXAMPLE 8

Fumed silica (Degussa's Aerosil® 200) was surface treated following the procedure of Example 1. The resulting treated fumed silica was dispersed in epoxy resin as described in Example 3. The STI of the treated fumed silica-epoxy composite was measured according to Example 4. Results demonstrate that the treated fumed silica of this invention exhibits higher shear thinning performance (STI=5.5) than untreated fumed silica, which when added to an epoxy resin, has no shear thinning properties (STI=1.0).

EXAMPLE 9

Silica was surface treated following the procedure of Example 1 with the exception that octyltriethoxysilane (Degussa's Dynasylan® OCTEO) was substituted for HDTMS. The resulting treated silica was dispersed in epoxy resin as described in Example 3 and the STI of the treated silica-epoxy composite was measured according to Example 4. The resulting STI of 1.45 demonstrates that shorter alkyl chain silanes are useful in this invention.

EXAMPLE 10

Silica was surface treated following the procedure of Example 1 with the exception that a higher viscosity polydimethylsiloxane (100 cSt) was substituted for the lower 50 cSt viscosity PDMS. The resulting treated silica was dispersed in epoxy resin as described in Example 3 and the STI of the treated silica-epoxy composite was measured according to Example 4. The resulting STI of 2.20 demonstrates that polysiloxanes of various viscosities are useful in this invention.

EXAMPLE 11

Silica was surface treated following the procedure of Example 1 with the exception that a chemically functionalized, hydroxy-terminated polydimethylsiloxane (Dow Corning® 4-2797, from Dow Corning, Midland, Mich.) was substituted for the 50 cSt PDMS. The resulting treated silica was dispersed in epoxy resin as described in Example 3 and the STI of the treated silica-epoxy composite was measured according to Example 4. The resulting STI=1.90 demonstrates that chemically functionalized polysiloxanes can be used in this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method of preparing a treated silica substrate comprising the sequential steps of:
   a) providing silica particles;
   b) contacting the silica particles with at least one polysiloxane conforming to formula (I)

wherein n is an integer greater than 1, preferably between about 30 to about 100;
   X is selected from a hydrogen atom or an R' group, preferably methyl;
   R, R' are independently selected organic groups, with from about 1 to about 20 carbon atoms; and
   Y and Z are silicon-containing terminating end groups, preferably Y is —OSi(CH$_3$)$_3$ and Z is —Si(CH$_3$)$_3$; and c) contacting the silica particles with an organosilane described by the formula:

$$RSi(R')_x(OR'')_{3-x} \qquad (II)$$

wherein R is a lone-chain hydrocarbon group having between about 8 to about 30 carbon atoms, and optionally contains organofunctional groups selected from the group consisting of vinyl, methacryl, amino, sulfur, and epoxy groups; R' and R" are independently selected from the group consisting of a methyl and an ethyl; and X is either 0 or 1.

2. The method of claim 1, wherein the silica particles are provided by precipitation.

3. The treated silica substrate produced by the method of claim 1.

4. A polymer composition comprising the treated silica substrate of claim 3.

5. The polymer composition according to claim 4, further comprising a polymer selected from the group consisting of epoxy resin, polyurethanes, polyesters, silicones, and hydrocarbon oils.

6. The polymer composition according to claim 4, wherein the STI of the polymer composition is about 1.2 to about 100.

7. The polymer composition of claim 6 wherein the STI of the polymer composition is about 1.4 to about 5.

* * * * *